Jan. 14, 1936.  H. T. GOSS ET AL  2,028,102
LIQUID DISPENSING DEVICE
Filed Dec. 16, 1932  7 Sheets-Sheet 7
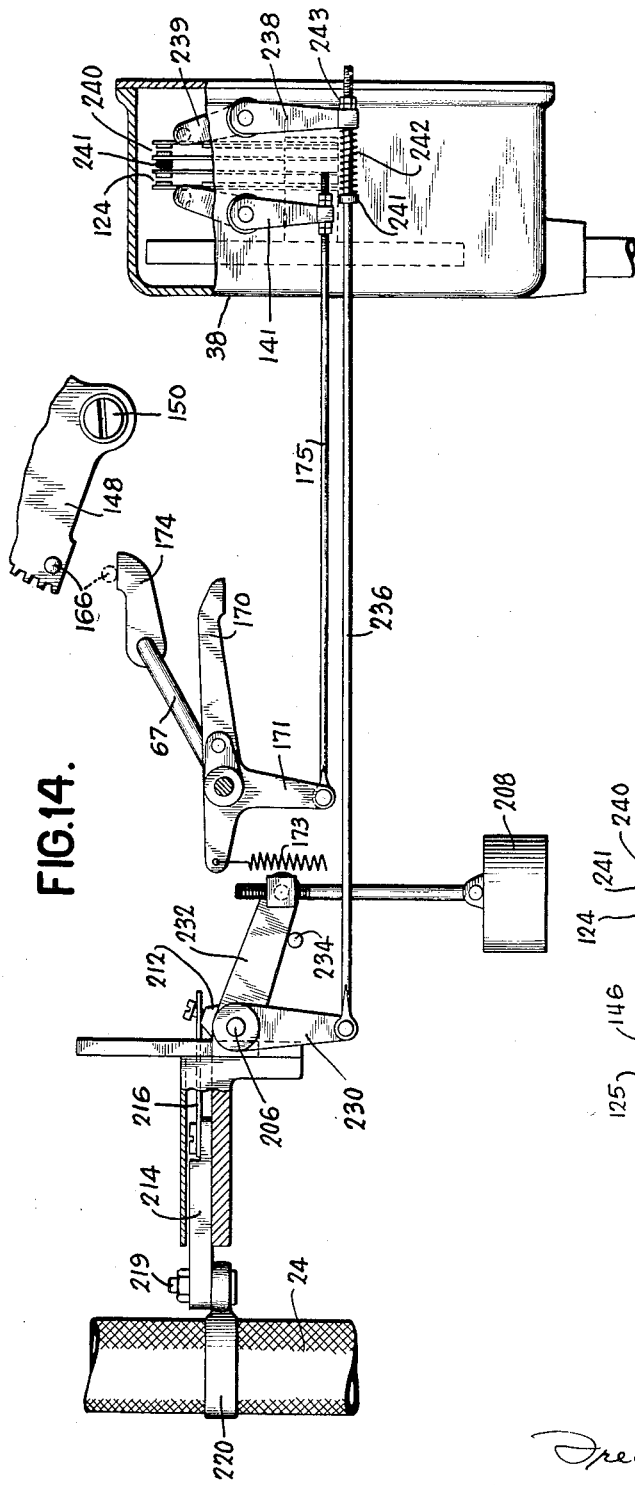
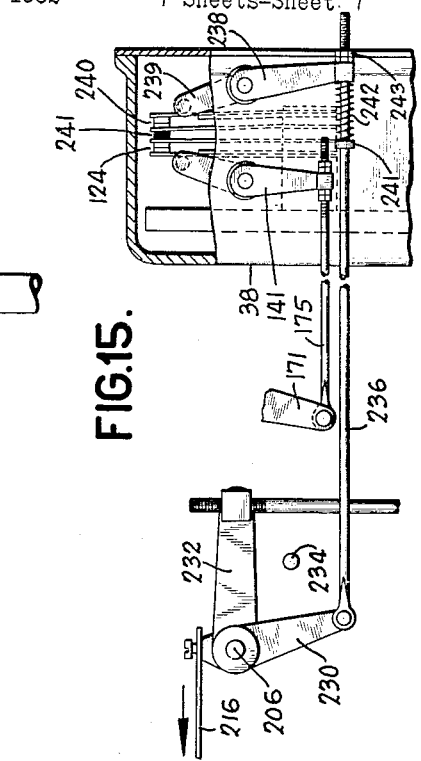
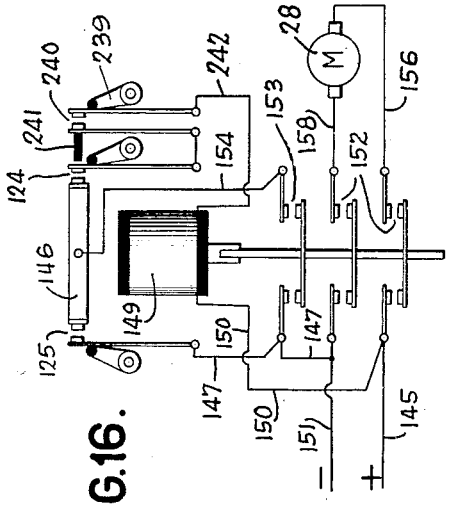
INVENTORS
HARRY T. GOSS
BJORNULF JOHNSEN
BY
Frederick Griswold Jr.
ATTORNEY Patented Jan. 14, 1936

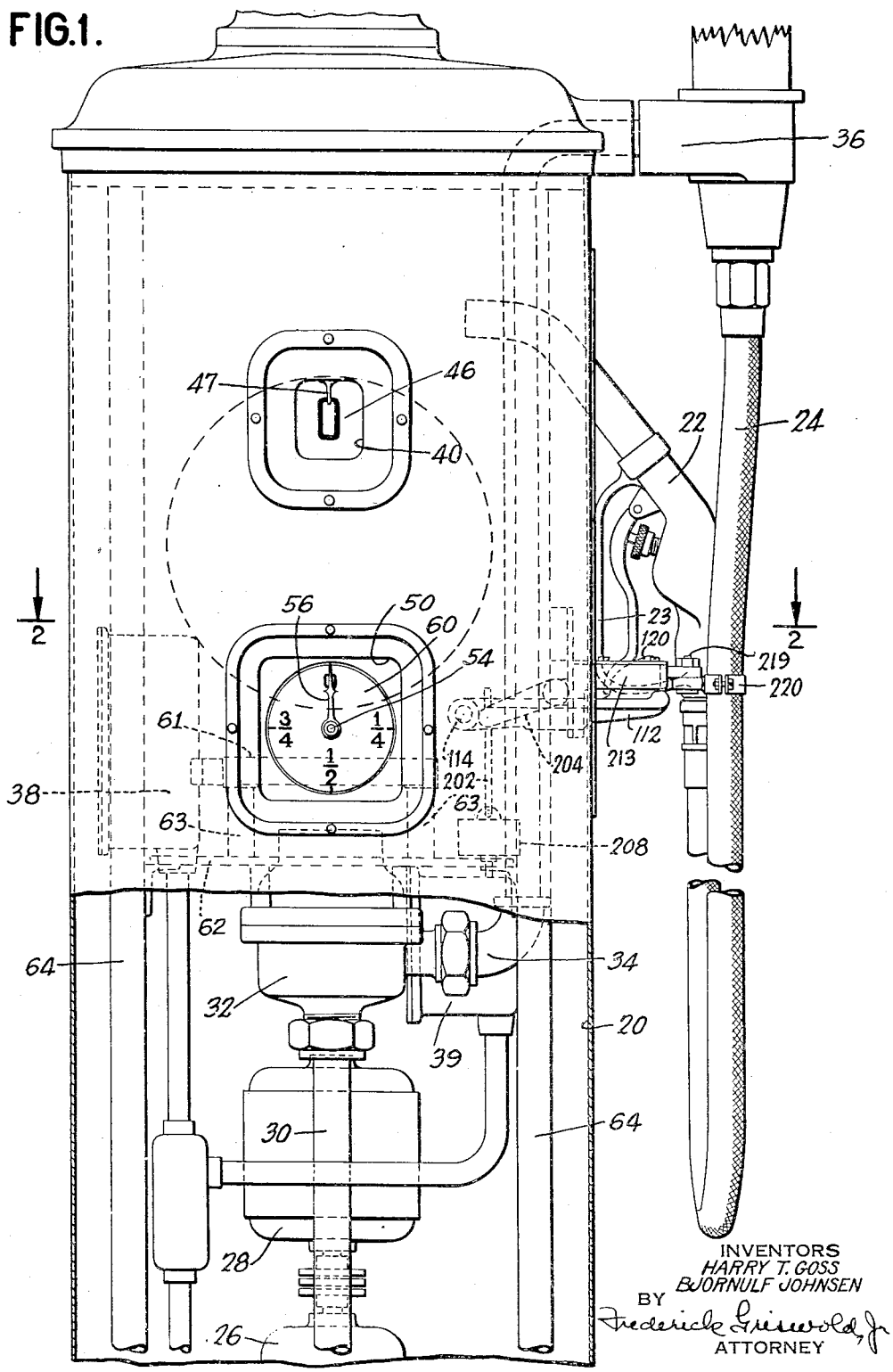

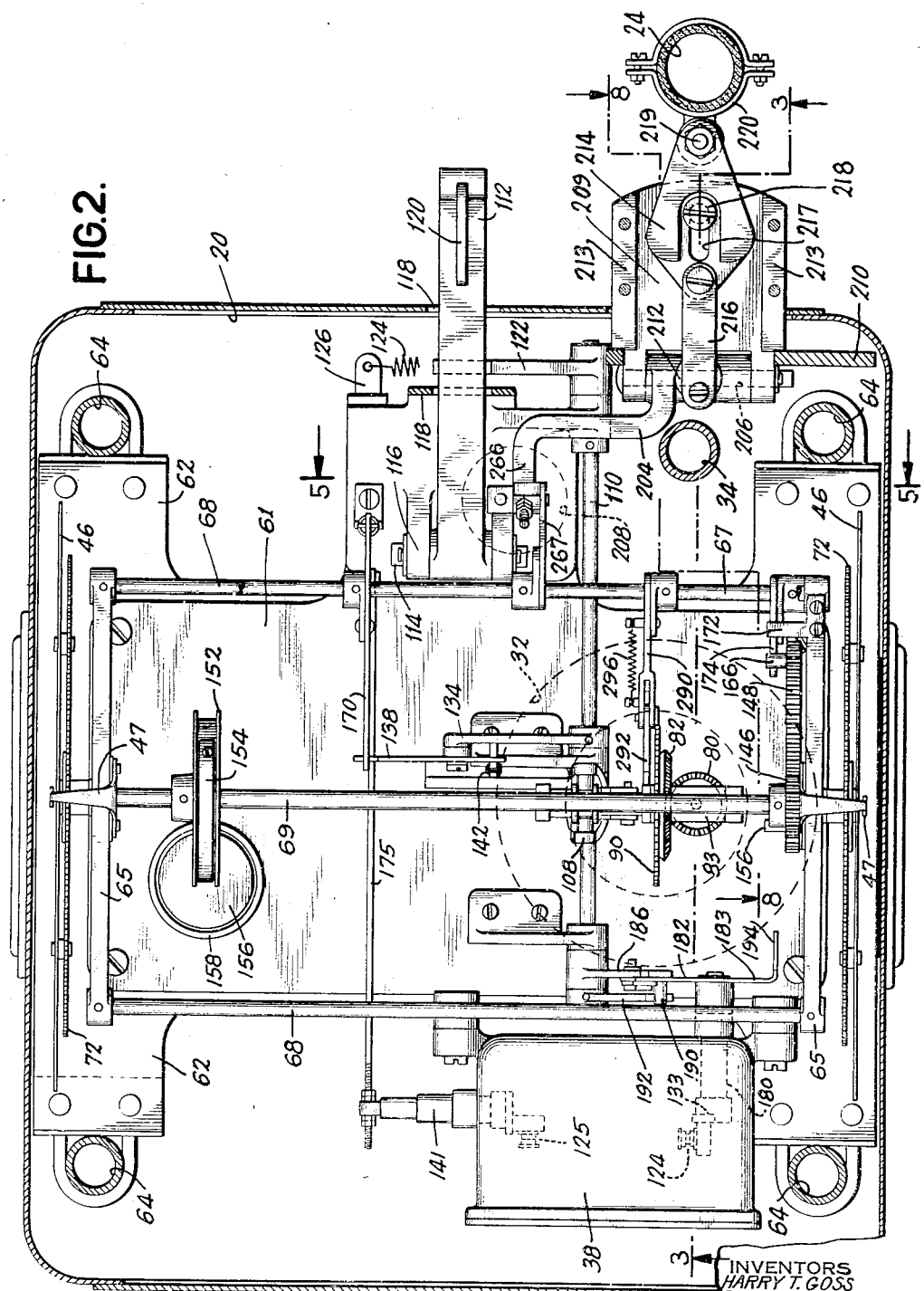

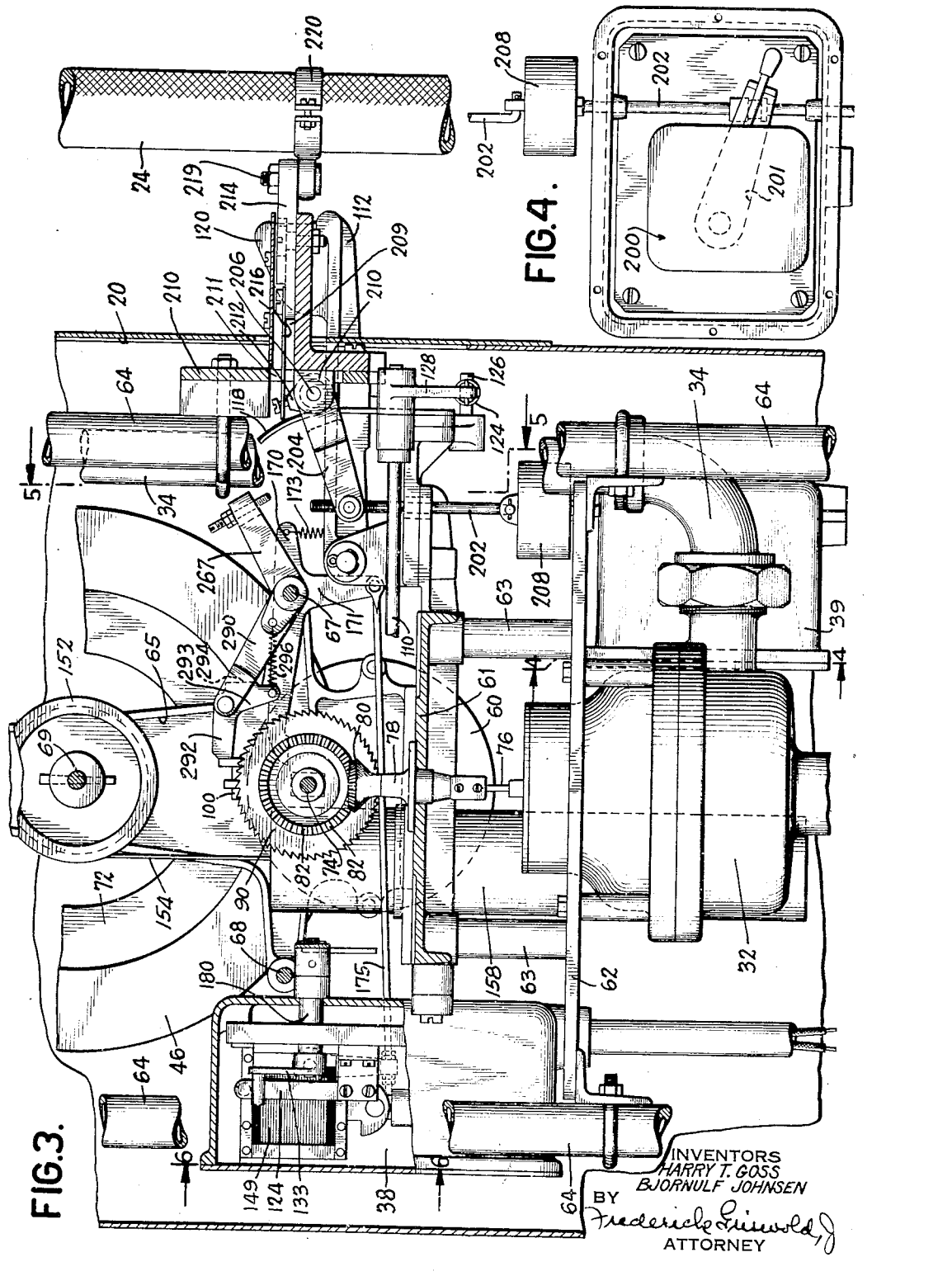

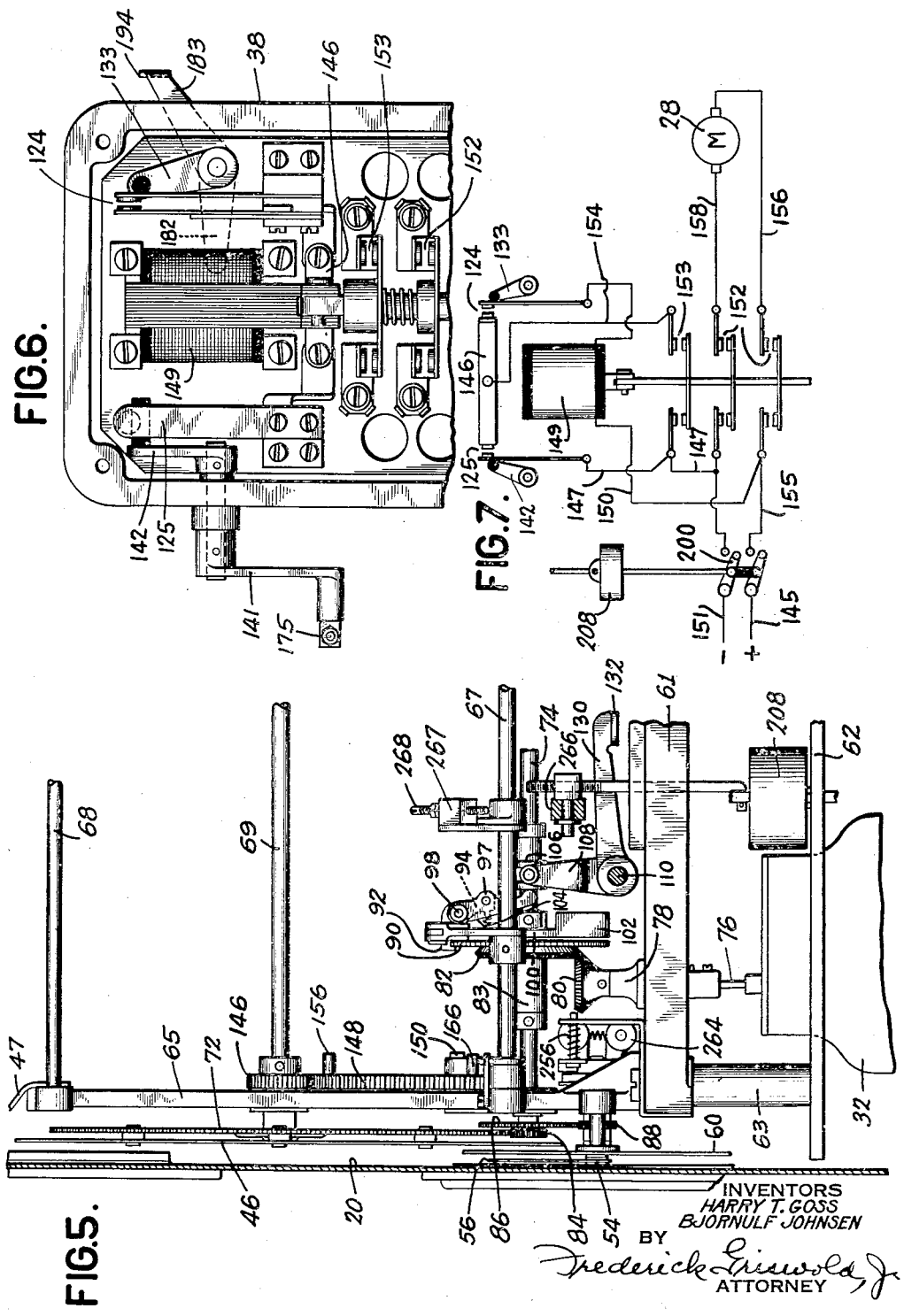

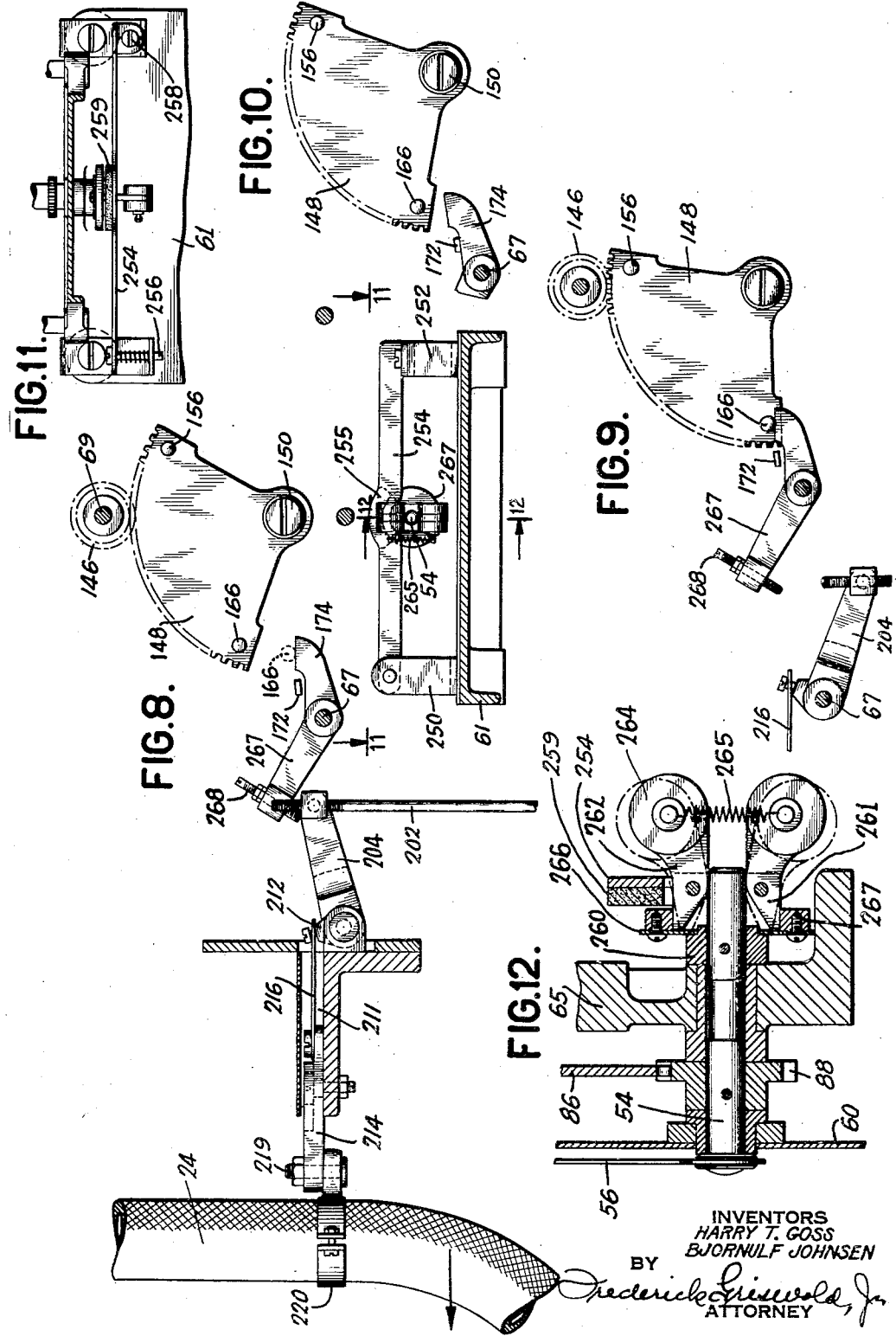

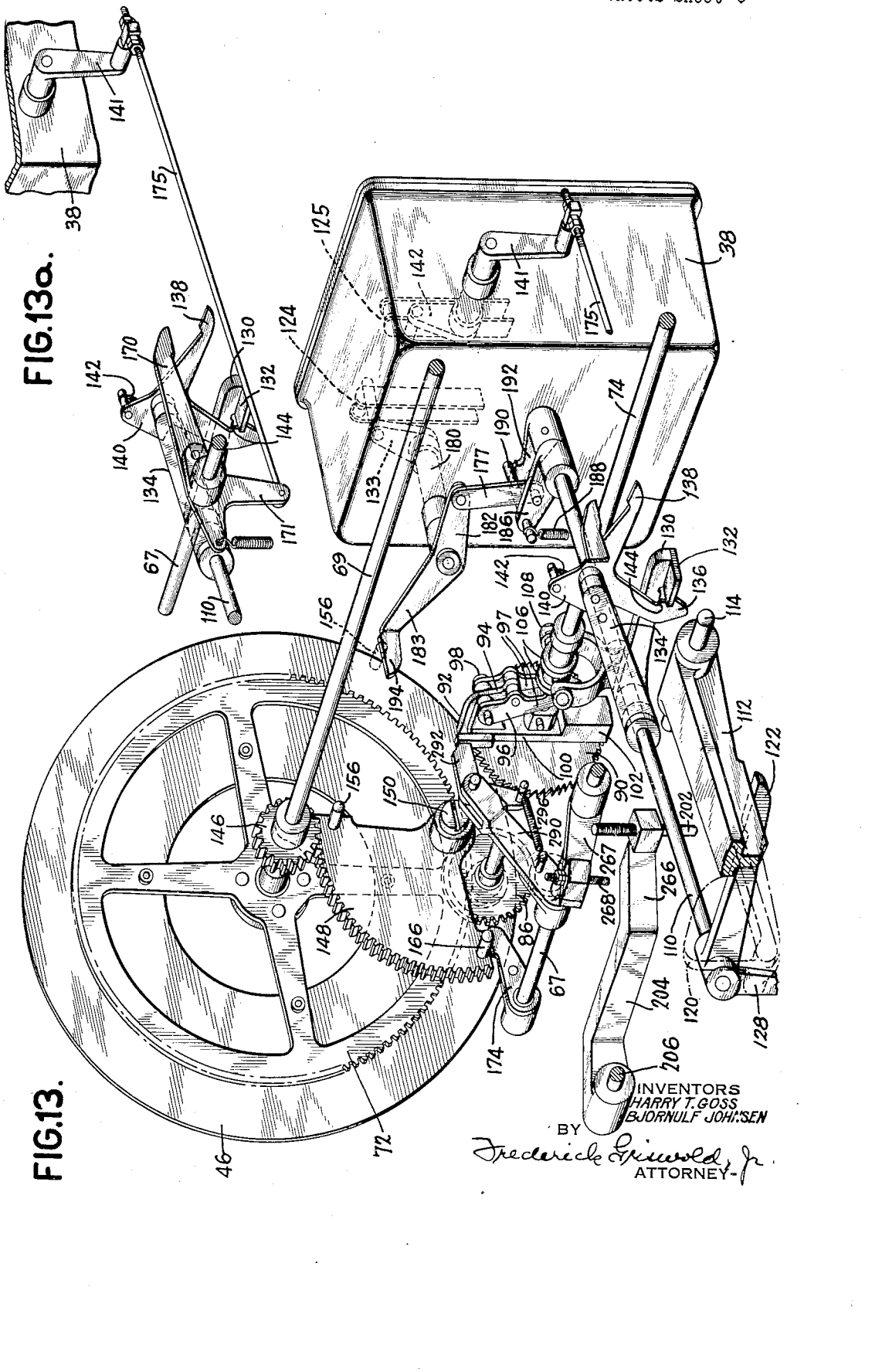

2,028,102

UNITED STATES PATENT OFFICE 2,028,102

LIQUID DISPENSING DEVICE

Harry T. Goss, Rutherford, N. J., and Bjornulf Johnsen, Brooklyn, N. Y., assignors to L. N. S. Corporation, New York, N. Y., a corporation of Delaware Application December 16, 1932, Serial No. 647,596

36 Claims. (Cl. 221—95)

This invention relates broadly to fluid dispensing devices such as are adapted to dispense gasoline and other liquid fuels at roadside service stations and the like, of the kind in which the elevation of the fluid, as from a tank, is automatic, for instance, by means of a motor driven pump, whereby the delivery of fluid is continuous and the attendant, instead of operating a pump handle to serve the fluid may stand at the vehicle tank where he can see exactly how much the tank will hold and serve it without spilling.

In copending applications, Serial Nos. 491,907, 535,335 and 536,108, the nozzle, by which the fluid is delivered, say, to the tank of a motor vehicle, is illustrated as carried upon a movable support when in inactive position or against a movable member which it retains in inactive position.

So soon as the nozzle is lifted from its support, the fluid flow establishing means is placed in a condition whereby its operation may be maintained. At the same time, the return of the indicating devices to initial position is initiated and when the indicating devices reach initial position, the flow establishing means is enabled to function to permit the delivery of fluid to the meter. After the desired quantity of fluid has been delivered and the nozzle returned to its support, the flow establishing means is caused to cease operation. The indicating means retains the indication of the number of units of measure of fluid delivery until the next transaction.

It has also been proposed heretofore to provide a fluid dispensing device in which the attendant effects the flow of fluid by pulling on the hose. This has usually been accomplished by connecting the hose with actuating devices for a switch in the circuit of electrically operated flow establishing devices whereby the circuit is closed when the attendant pulls on the hose, and the circuit is opened when no pull is exerted on the hose.

One object of the present invention is to control the operation of a fluid dispensing device of the type illustrated in the copending applications by a controlling device rendered operative by a pull on the delivery hose.

As in the copending applications, the fluid dispensing device of this invention provides, in the preferred embodiment, a holding circuit comprising an electromagnet by which the pump motor circuit is maintained and which circuit is initially energized by the closing of a switch effected by the return of the indicator to initial position. In situations where a master or control switch is provided in the electrical circuits of the fluid dispensing device, which switch is closed by a pull on the delivery hose and opened when the hose is released, situations may arise when a customer changes his mind and decides to purchase an additional quantity of fluid after the amount originally asked for has been delivered and after the attendant has released the hose but before the nozzle has been returned to its support. The opening of such a switch by the release of the hose results, of course, in the deenergization of the electromagnet, thus opening the holding circuit and ordinarily preventing the operation of the flow establishing means until the indicator has again been returned to initial position.

Another object of the invention is, therefore, to provide means which shall effect the reenergization of the electromagnet when there is a pull on the hose and without necessitating the return of the indicating means to initial position.

It is also an object of the invention to provide means to stop the indicating devices exactly at initial position which shall avoid the application of forces to the indicating devices and which shall come into operation by virtue of the position of the indicating devices on their return movement to zero position.

The invention also seeks to provide mechanism stopping the indicating devices exactly at initial position which shall be so constructed as to avoid damage to the coacting parts.

Still another object of the invention is a simplification of the structure of the copending applications by permitting the disposition of the contact mechanism in close proximity to the indicating mechanism.

It is also an object of the invention to provide a switch mechanism and wiring which shall permit the inclusion of both the master or control switch and the other necessary switches in the same enclosure and circuit.

It is a further object of the invention to provide improved circuits for the control and operation of the fluid elevating devices in a fluid dispensing device of the present invention.

Still another object of the invention is the provision of means to govern the speed of return of the indicating devices to initial position thereby to avoid shock to the parts.

The invention also seeks a fluid dispensing device which shall be practical from the standpoint of ease and accuracy of manufacture and convenience and durability in use.

These and other objects of the invention and the means for their attainment will be more apparent from the following detailed description, taken in connection with the accompanying drawings illustrating one embodiment by which the invention may be realized, and in which:—

Figure 1 is a view illustrating, in elevation, the upper portion of a fluid dispensing standard provided with means whereby the number of units of fluid dispensed is indicated to the purchaser, a portion of the standard being broken away to expose details of the fluid flow establishing means, and showing the nozzle support in accordance with this invention.

Figure 2 is a transverse sectional view showing the index mechanism of the fluid dispensing device, taken in the plane indicated by the line 2—2 of Figure 1.

Figure 3 is a transverse vertical sectional view of the index mechanism taken in the plane indicated by the line 3—3 in Figure 2 and looking in the direction of the arrows and showing specifically the nozzle support and mechanism by which the flow establishing means is controlled by the hose.

Figure 4 is a fragmentary view in front elevation showing the switch box interior and taken on the line 4—4 of Figure 3.

Figure 5 is a sectional view taken in a transverse vertical plane indicated by the line 5—5 of Figures 2 and 3 and looking in the direction of the arrows.

Figure 6 is a view showing the interior of the control box and the several sets of contacts and other controlling mechanism.

Figure 7 is a somewhat schematic view showing the various control and holding circuits of the mechanism.

Figure 8 is a fragmentary vertical sectional view showing particularly the relation between the indicating means and the pull hose control means while the index dial is recording a delivery of fluid and the hose is under tension.

Figure 9 is a detail view showing the parts of Figure 8 in zero or initial position.

Figure 10 is a view similar to Figure 8 but showing the position of the parts when the tension on the hose has been relieved.

Figure 11 is a detail view showing the brake mechanism which controls the speed of return of the indicating means to initial position, taken on the line 11—11 of Figure 8.

Figure 12 is a sectional view of the brake mechanism taken in the plane indicated by the line 12—12 of Figure 8 and looking in the direction of the arrows.

Figure 13 is a somewhat schematic perspective view showing one embodiment of this invention, parts being displaced and parts being broken away in the interest of clearness.

Figure 13a is a fragmentary view showing the complete construction of parts broken away in Figure 13.

Figure 14 is a fragmentary view, showing, in side elevation, a modification of the circuit closing instrumentalities wherein both the circuit closer of the pump motor circuits and the control switch are disposed in the same housing, the parts being shown in open circuit position.

Figure 15 is a view substantially similar to Figure 14 but with the parts in closed circuit position.

Figure 16 is a view showing the wiring diagram of the circuits controlled by the structure of Figures 14 and 15.

Referring first to Figure 1, in the illustrated embodiment, a dispensing standard or housing 20 of any convenient shape, is adapted to support and contain the devices for elevating liquid from a tank (not shown), say, beneath the ground and measuring it for delivery from a valve controlled nozzle 22 on the end of a hose 24 into, say, the fuel tank of a motor vehicle. Flow establishing means, such as a pump 26, driven by the motor 28, elevates the liquid, in this instance, through the pipe 30 to meter 32 from which the liquid passes by a pipe 34 to the connection 36 for the hose 24. A control box 38 containing the contacts for the motor circuits is indicated in dotted lines in Figure 1 and a switch box, also for controlling the circuit, at 39.

In the front of the housing and at a desirable elevation where it may be easily visible or, if desired, in both the front and back walls thereof, the housing 20 is formed with openings 40 by which the dial 46, indicating the number of units of measure of fluid delivered from the nozzle 22 is visible. Behind this opening 44 is an index finger 47 indicating the initial or zero position of the dial 46. Also formed in the casing is an opening 50 behind which is the stub shaft 54 upon which a pointer 56 is mounted. The pointer 56 is adapted to travel over a dial 60 to register fractions of the units of measure of the fluid delivered.

The mechanism indicating the units of measure of the fluid delivered from the nozzle 22 is supported upon and above a transversely extending supporting means shown as a transverse frame 61, Figure 3, referred to hereinafter for convenience as a platform, carried upon uprights 63 supported from a frame 62 supported by pillars 64 extending upwardly within the housing 20 from the base of or support for the structure. The platform 62 carries below it, if desired, the meter 32 and the switch box 39. Upon the platform 61 at the front and rear thereof, respectively, between the pillars 64 are bearing frames 65 which are suitably braced and spaced by the spacing rods 68 which pass through the frames 65.

Journalled preferably substantially centrally of the bearing frames 65 is a freely rotable dial shaft 69 on the outer ends of which, outwardly of the frames, are ring gears 72 each carrying a dial 46. Also journalled in the bearing frames 65, in a lower part thereof, is the jack shaft 74.

During the delivery of the fluid, its flow through the meter 32 causes a rotation of the meter shaft 76 once for each unit of measure of fluid passing therethrough. The meter shaft 76 is journalled in a bearing 78 carried by the supporting frame 61. The upper end of the meter shaft 76 carries a bevelled pinion 80 which meshes with a bevelled gear 82 loosely mounted on the transverse jack shaft 74 to which it may be clutched to cause the jack shaft 74 to be rotated by the meter 32 and from which it may be declutched to permit the dials to be rotated, say, in the opposite direction independently of the meter shaft, in returning them to zero or initial position. The ratio of the bevel pinion 80 and gear 82 is such that the jack shaft 74 makes one-half revolution for each unit of measure of fluid delivered. The jack shaft 74 drives, through a pinion 84 on its end, outwardly of the bearing frame 65, the ring gear 72 carrying the dial 46. Thus the dial 46 is rotated from the meter shaft 76 in direct relation to the number of units of measure of fluid passing through the meter 32. Also carried with the jack shaft 74 is another gear 86 meshing with the pinion 88 on the stub shaft 54 whereby the split gallon pointer 56 is rotated.

While various types of clutch means may be adopted between the meter shaft 76 and the jack shaft 74, there is illustrated in the drawings, Figures 5 and 13, a clutch which is particularly effective for the purpose at hand. A disc of relatively large diameter is carried with the bevel gear 82 on the loose sleeve 83 and is formed with a relatively large number of teeth adapted to be selectively engaged by a clutch finger or detent 92 comprised in the companion clutch element fixed to the jack shaft 74. This clutch finger 92 forms one arm of a bell crank like lever 92-94 which is pivoted between its ends, as at 98, on an arm 100 fixed on the jack shaft 74 to rotate therewith, the arm 100 having a diametrically opposite extension 102 or counterweight to balance the weight of the clutch elements 92-96 and render smoother and more even the rotation of the jack shaft 74. Also pivoted at 98 are two spaced levers 97 secured to the arm 94 of the bell crank and which straddle the jack shaft 74 at their lower ends. A spring 104, Figure 5, between the arm 100 and the lever arms 97 normally urges the detent 92 into engagement with the opening toothed disc clutch member 90. It will be apparent that the greater the number of teeth on the disc 90, the more promptly and more exactly the clutch parts 90, 92 will come into engagement and thus great precision is obtained in the action for a purpose which will be brought out more fully hereinafter.

The clutch is preferably actuated by a collar 106 freely slidable on the jack shaft 74 adapted to be moved into engagement with the clutch arms 97 by which the detent 92 is moved out of engagement with the teeth on the disc 90 against the action of the spring and the jack shaft 74 is declutched from the meter shaft 76. This clutch operating collar 106 is actuated by a forked clutch operating lever 108 (Figure 5), loosely mounted upon a transversely extending operating shaft 110. The rotation of this operating shaft 110 through a predetermined angle to clutch and declutch the jack shaft is controlled by the weight of the nozzle 22 on its support through an intermediate instrumentality, hereinafter to be described more in detail. Suffice it to say at this point that in the illustrated embodiment, the clutch operating lever 108 Figure 13, forms one arm of a bell crank 108, 130 or the equivalent, the other arm 130 of which is adapted to be moved in a counter-clockwise direction by a latching pawl 136 engaging therewith, which is carried by an arm 134 fixed on the operating or rock shaft 110, all as shown, described and claimed in a copending application, Serial No. 535,335 filed May 6, 1931.

As seen in Figure 2, the nozzle support takes the form of a lever 112 pivoted as at 114 in a bearing 116 on the supporting platform 61 and movable between elevated and depressed positions within a slotted guide frame 118. As shown in the drawings, Figures 1 and 2, the nozzle support lever 112 has an upwardly extending tongue 120 which may pass through a slot in the guard 23 on the nozzle, thereby holding the nozzle on the support. Obviously, any movable support for an element of the delivery hose is within the purview of the invention.

Beneath the free end of the lever 112 is the free end of an arm 122 (Figure 2) also fixed on the operating shaft 110, so that when the nozzle is raised off the supporting lever the arm 122 may move upwardly and rotate the operating shaft 110 in a counter-clockwise direction, as viewed in Figure 5, thereby moving, by means of the lever 134 and lock pawl 136, the clutch operating lever 108 through an angle in a counter-clockwise direction to depress the clutch detent arm 97 and release the clutch. The shaft 110 is normally urged to turn in a counter-clockwise direction by a spring 124 connected at one end to a lug 126 on the frame 61 and at its other end to the end of a downwardly directed arm 128 (Figure 3) fixed on the shaft 110. This spring 124 is of sufficient strength to turn the shaft 110 and cause the disengagement of the clutch 90, 92 when the nozzle 22 is off its support 112, but is insufficient to raise the arm 112 against the weight of the nozzle 22.

As has been pointed out hereinbefore, the purpose of disconnecting the jack shaft 74 from the meter shaft 76 is to permit the indicating means 46 and 56 to be returned to zero preparatory to recording the delivery of fluid in the next transaction. In order to prevent a dishonest operator from stopping the indicating means before such means has travelled all the way back to initial or zero position and commencing to deliver fluid with the dial registering from that advanced point, latching means are provided which engage the clutch operating lever in clutch releasing position and hold it in such position until the indicating means reaches initial position, when the clutch operating lever is released. It is also not until such time that the pump is permitted to operate. The mechanism for accomplishing this function is illustrated in Figure 2.

Freely rotatable on the operating shaft 110 is an arm 130 (Figure 13) proximate the clutch operating arm 108 and secured thereto to turn therewith and which may, if desired, be integral with the clutch operating arm 108 to form, in effect, a bell crank lever. At the end of this arm 130 is a lug 132. Also carried on the shaft 110 and fixed thereto is an arm 134 carrying pivotally at its end a latching pawl 136. The latching pawl 136 has a tripping arm 138 extending outwardly away from operating shaft 110, and an arm 140 extending generally toward the shaft 110. A tension spring 142 connected at one end to the arm 140 and at its other end to the arm 134, causes the latching pawl 136 to normally tend to turn in a counter-clockwise direction, (as viewed in Figure 13) to cause a notch 144 at its end to engage, at certain times, the lug 132 on the arm 130 of the clutch operating bell crank lever 108, 130 to shift the clutch detent arm 96. Thus when the weight of the delivery means is on its supporting lever 112 and the shaft 110 rotated to its extreme position in a clockwise direction (as viewed in Figure 5), the arm 134 is depressed. At the same time, the clutch spring 104 forces the lever arm 97 of the clutch detent lever toward the right (as viewed in Figure 5) and permits the parts to engage. The latching lever 136 is beneath the lug 132 and is urged in engagement therewith by the latch spring 142. When the weight of the delivery means is removed from the support, the spring 124 causes shaft 110 to rotate in a counter-clockwise direction, the rotation of shaft 134 raises the latching pawl 136, which at that time is in engagement with the lug 132 carrying the lever arm 130 with it to also turn in a counter-clockwise direction to throw the clutch and release the jack shaft 74 from the meter shaft during the time that the indicating means 46 and 56 are returning to zero position.

It will be readily appreciated that when the jack shaft 74 is released from the meter shaft 76 by the separation of the clutch elements 90, 92 upon removal of the nozzle 22 from its support 112 that the dials 46 are freely rotatable in either direction, the jack shaft 74, of course, turning with the dials 46. Provision is made for returning the dials to initial or zero position when so released.

Fixed on the dial shaft 69 is a pinion 146 in mesh with a segmental gear 148, pivoted as at 150 (Figure 5) on a fixed part of the framework. At the right, as viewed in Figure 13, the segmental gear is provided with a pin 156 and at its other end with a pin 166. In this figure, the gear is shown as at its initial or zero position while that position which the pin 156 will reach when the dial 46 has completed one revolution is indicated in dotted lines in engagement with a lever 183, as will hereinafter be explained.

Power means is provided for returning the dials to initial position. A spring or other tension device may be utilized. As shown, however, the dial shaft 69 is provided with a sheave 152 fixed thereon, upon which is wound, as the dials turn away from initial position, a tape or cable 154 to which is attached a counterweight 156 vertically movable in a tube or guide 158 carried by the platform 61. When the jack shaft 74 is clutched to the meter shaft 76 and rotated thereby, the dial 46, of course, rotates from zero to register the number of units of measure of the fluid delivered. This rotation, with the consequent rotation of the pinion 146 moves the segmental gear 148 about its pivot 150 and at the same time winds up the tape on the sheave against the action of gravity on the weight 155 and stores up energy by the elevation of the weight. When the jack shaft 74 is disconnected from the meter shaft 76, the weight 155 commences to descend thereby rotating the dial shaft in the opposite direction back to zero. At the same time, the segmental gear 148 is turned about its pivot 150 in the opposite direction by the rotating pinion 146 back to its initial position.

The return of the indicating means 46 to initial position causes the reconnection of said indicating means with the driving means therefor so that the indicating means may be again moved to measure the units of fluid delivered. It will be recalled that when the weight of the nozzle 22 is removed from the supporting lever 112, the jack shaft 74 is declutched from the meter shaft 76 and one arm 130 of the clutch operating lever 108, 130 is retained in clutch releasing position by the latching pawl 136. When the dial 46 reaches zero position, the latching pawl 136 is released so that the clutch operating lever 108, 130 may rotate in a counter-clockwise direction under the influence of the clutch spring 104 thereby permitting the clutch elements, detent 92 and toothed disc 90, to be reconnected.

A preferred form of releasing means for the latching pawl 136 is illustrated in Figure 2. The latching or hook pawl 136 is generally held in latching engagement with the clutch lever because of the tendency of the arm 140 to rotate in a counter-clockwise direction under the influence of the hook pawl spring 142. A rocking device is provided to release the hook pawl 136 when the dial 46 reaches zero position. As shown, the rod or shaft 67 is pivotally mounted upon an element of the frame-work. A lever 170, fixed on the rock shaft 67, is normally disposed above the end of the tripping arm 138 of the hook pawl 136 for engagement therewith. This lever 170 is adapted to be depressed to trip the latch 136 and free the clutch operating lever when the dials 46 reach initial position. An arm 174 is fixed on the rock shaft 67 for engagement by the pin 166. When, therefore, as the pin 166 reaches initial position, it engages and depresses the arm 174 on the rocking rod 67, causing a corresponding depression of the end 170, which depresses the lock pawl arm 138 and causes the pawl 136 to disengage itself from the lug 132 on the clutch operating lever arm 130 permitting the clutch operating lever, therefore, to fall or turn in a counter-clockwise direction under the influence of the clutch spring 104, as the arm 96 is forced away from the arm 100, and allow the clutch elements (detent 92 and toothed wheel 90) to again become engaged. A stop 172, carried on the frame, limits upward movement of the arm 174 and hence the angle through which rod 67 turns.

*Zero stop*

It is obviously necessary that the indicator be halted exactly at zero on its return to initial position. In the illustrated embodiment (Figure 3), an element of the clutch is stopped at initial position. As shown, the rock shaft 67 carries an arm 290 which normally tends to be raised out of the way of the clutch by the action of spring 173, but which, when the arm 174 is rocked downwardly by the stud 166, is moved into position to be contacted by the clutch member 100 at zero position. As this arm 290 is sometimes rocked downwardly during a transaction by the attendant pulling on the hose 24, is elsewhere explained herein, damage to the parts is prevented by forming the end 292 as a bell crank pivoted to the arm 290. The other arm 293 is held against a stop 294 on the arm 290 by a spring 296 so as to normally be in a position to be engaged by the clutch arm 100, but should the arm be rocked down at a time when parts of the clutch are in the way, the pivoted end 292 will yield upon striking the clutch and no damage will result.

As has been pointed out hereinbefore, it is sought to prevent the operator, in dispensing fluid, to halt the dial or other indicating means before it returns completely to initial position and start the delivery of fluid at a time when the dial already registers a quantity of fluid. If, therefore, before the dial reaches initial position the nozzle should be returned to its supporting lever for any reason, the clutch elements may become reengaged, but this will be rare because in ordinary circumstances, the return to zero occurs faster than an operator can manually return the nozzle to its support. Even so, such manipulation will merely result in the stopping of the dial at that point and will not result in the delivery of liquid because the operation of the fluid flow establishing means (pump 26) is not initiated until the dial reaches zero and this initiation of the pump operation is not within the control of the operator. When, however, the dial rotates to initial position, the pin 166 not only releases the locking pawl 136 so as to permit the clutch 90, 92 to reengage, but also causes the completion of the circuit through the motor whereby the motor may be started and the pump may be operated to elevate the fluid and cause its delivery, all subject, however, to the additional control element responsive to the position of the hose 24 hereinafter to be described. Therefore, because of the requirement that the actuation of the fluid elevating means 26 be not initiated until the indicating means 46 be returned to initial position, there is a lapse of time after the nozzle 22 is removed from the supporting lever 112 before the fluid elevating means 26 commences to function. On the other hand, the pump 26 must be stopped so soon as the nozzle is returned to its support, although the zero on the dial remains at a point away from the index. In the illustrated embodiment, therefore, the operation of the pump is controlled by a circuit adapted to be interrupted at two points, one set of contacts in the circuit being closed upon the removal of the nozzle from the hook and consequently opened when the nozzle is returned to the hook, and a second set of contacts in the circuit is closed in order to complete the circuit and start the pump motor when the indicating means returns to zero position, and which are opened when the indicating means leaves initial position.

The control box 38 Figures 6 and 13 contains the circuits by which the operation of the flow establishing means is effected. These circuits include the two sets of contacts or switches 124 and 125. These are actuated as follows:

Arm 170 has associated therewith a downwardly depending arm 171, preferably integral therewith, to the end of which is attached a link 175 extending to the control box 38 and connected with an arm 141 operating the dial switch 125.

Switch 124 is actuated by a lever 133 on a rock shaft 180 protruding from the face of the control box and carrying at its outer end a lever 182, 183 fixed thereon at its midpoint. Arm 182 of this lever is pivotally connected by a link 177 with an arm 186 loosely mounted on the operating rock shaft 110, which arm is normally drawn downwardly, as shown in Figure 13, by a spring 188. Arm 186 also carries a pin 190 adapted to be engaged when the rock shaft 110 is turned in a clockwise direction by an actuating arm 192 fixed on the shaft 110. Thus whenever shaft 110 is rocked in a clockwise direction, as when the nozzle is replaced on its support, the arm 192 engaging pin 190 rotates arm 186 against the action of the spring to rotate lever 182, 183 and with it the shaft 180 to open switch 124 and break the circuit in which it is. Arm 183, conveniently, has a toe 194 on the end thereof, which is engaged by the pin 156 on the segment gear 148 in its extreme position of rotation to likewise rotate lever 182, 183 to open the switch 124.

Referring now to Figure 7, which shows a diagram of the electrical circuits which make the operations possible: One set of contacts or switch 124 is closed when the nozzle is taken off its support, while the other set of contacts or switch 125 is closed when the dial reaches initial position. In order that the motor 28 can operate, a gap in the motor circuit must be closed by the switches 152, (for safety sake, four gaps are shown) and the closing of the contacts 152 is accomplished by an electro-magnet or solenoid 149, the circuit of which is not completed until the second switch 125 is closed by the return of the dials to zero position. So soon as the dial 46 commences to record the delivery of fuel, its movement away from zero position opens the second switch 125 since the pressure by the pin 166 on the arm 174 is relieved and the spring 173 draws the arm 170 upwardly, thereby rocking the end of the arm 171 in a clockwise direction as viewed in Figure 2, and pushing, by means of link 175, the lever 141 controlling this switch 125 and thereby permitting it to open. However, so long as the holding switch 124 is closed, the electromagnet is energized and the motor circuit remains closed. When the nozzle is returned to its support, the holding switch 124 is opened, interrupting the holding circuit and the motor circuit is opened, stopping the fluid elevating devices immediately.

The holding switch 124 is closed in the following manner:—

So soon as the nozzle is lifted from its support, the shaft 110 is adapted to be rotated under the influence of the spring 124 and this causes the arm 192 fixed thereon, to be turned in a counter-clockwise direction, as viewed in Figure 13. This downward movement of the arm 192 permits the spring 188 to draw the link 177 which is connected with the arm 182 of a switch controlling means pivotally mounted on the control box 38, the arm 133 of which controls the contacts 124. The contacts 124 are thus closed immediately upon the removal of the nozzle from its support and thus one of the two switches in the holding circuit is closed.

The holding circuit is completed so that the pump can start delivering fluid as soon as the dials 46 are returned to zero position. The rocking lever 170 has connected to its end the link 175 leading to one arm 141 of a switch actuating bell crank 141, 142 pivotally mounted on the motor control box containing the circuit closers and auxiliary devices of the motor circuit. When this link is advanced by the movement of the lever 170 under the influence of the spring 173, the contacts 125 are opened. The contacts are held open or permitted to separate by virtue of their inherent resiliency. So soon as this switch 125 is closed by contact of pin 166 with the arm 174, the holding switch 124, being held closed, the holding circuit is established. Current then flows from the main 145, Fig. 7 (assuming switch 200 is closed) through line 150, solenoid winding 149, through contacts 124, line 146, contacts 125, line 147 to the main 151. This circuit energizes the electromagnet 149 thereby closing a series of contacts, to wit, contacts 152 of the motor circuit and a pair of contacts 153 in a holding circuit. In the holding circuit thus established, current flows from the main 145 through line 150, solenoid winding 149, contacts 124, line 146, line 154 and through the closed contacts 153 and line 147 to the negative main 151. The holding circuit remains established so long as contacts 124 remain closed and even though contacts 125 are open by the rotation of the dial from zero in recording the units of fluid delivered by the pump. (The movement of the pin 166 away from the arm 174 permits the spring 173 to advance the link 175 and open the contacts 125.)

At the same time, the motor circuit is established since current flows from the main 145, line 155, contacts 151, line 156 to the motor 28, line 158, contacts 152 to the negative main 151.

When the zero on the indicator dial starts to move away from the index, the lever 170 and its link 175 moves under the influence of spring 173 and the contacts 125 are opened. However, due to the holding circuit, the solenoid remains energized to keep the motor circuit closed and the motor continues to run until the contacts 124 are opened on the return of the nozzle to its support, the depression of the supporting lever 112, of course, rotating the shaft 110 and arm 192 in a clockwise direction, elevating the link 177 and opening the circuits 124. This deenergizes the solenoid and the motor circuit is broken and the motor comes to rest stopping the pump.

During the delivery of fluid, as the meter shaft 76 rotates, the jack shaft 74 is rotated, which in turn rotates the dials 46 by means of the pinions 84, the pinions 84 and annular gears 72 being so proportioned that the numerals representing the several units of measure are brought past the index as units of fluid are delivered by the pump. While at the same time the stub shaft 54 is also rotated from the jack shaft 74 to indicate fractions of each unit as they are delivered. If at any time while the pump is operating, the valve should be closed and the pressure built up within the system, such pressure, after a predetermined maximum is reached, will open a suitable and well known pressure relief valve and permit the fluid to return to the reservoir from which it has been drawn through the pipe 30.

The construction just described results in the continuous operation of the pump and the maintenance of liquid under pressure in the hose 24 so long as the nozzle 22 is off its support 112, since the holding circuit is not interrupted until the switch 125 is opened by the return of the nozzle to the support, as has been explained. In principle, so much of the structure as has been described is claimed broadly in copending applications Serial Numbers 535,335 and 536,108, although details of construction differ.

*Pull hose control*

Situations arise, however, when it is desirable to halt the flow of fluid when the nozzle is off its support. For instance, a fire may break out in the vicinity of the pump while the attendant is standing by the side of a motor vehicle and delivering fluid into the fuel tank thereof. Or the motor vehicle may drive away while the nozzle is still in the opening in the fuel tank thus placing a strain upon the hose 24, which causes its rupture, spilling fluid upon the ground which may catch fire. So long as the pump operates, the fire will be continuously fed. Further, the purchaser may decide to take an additional quantity of fluid. As an added safety feature, therefore, it is proposed that the flow establishing means be not permitted to operate except when the attendant so wills. As the attendant will be required to place the nozzle in the inlet opening of a fuel tank the control of the flow establishing means may be effected by the movement of the hose 24.

An additional control switch or master switch 200 is, therefore, provided in the control box 39 in the supply mains 145, 151 by which electrical energy is conducted to the pump motor circuit. The control of this switch 200 is effected by the hose 24. As shown, the movable contact arms 200 of the switch are opened and closed by a lever arm 201, Figure 4, actuated by a vertically movable rod 202, to which it is attached. The rod is suspended from a lever 204 fixed on a rock shaft 206 and carries a weight 208 whereby the rod tends to always assume its lowermost position. Rock shaft 206 is journalled, say, on a frame 210 carried within the casing 20 adjacent to the hose support 112. The frame 210 is formed with a slot 211 with which a channel member 209 registers, the channel member being formed with spaced bearings inwardly of the frame in which the rock shaft 206 turns and extends outwardly through the casing 20 in a portion, channel shaped in cross-section. The rock shaft 206 also has an upwardly extending arm 212 fixed thereon and comprises with the switch closing arm 204 thereon what is in effect a bell crank. The upwardly extending arm 212 is connected by a link 216 to a slide 214 of substantially diamond or kite shape, (see Figure 2) with rounded corners, of a transverse diameter less than the width of the channel 211 and adapted to reciprocate within the ways 213. The slide 214 is pivotally mounted in the channel 211 while at the same time is adapted for reciprocation axially of the ways 213 by being formed with a slot 217 through which a pin 218 passes, the pin being fixed in the longitudinal axis of the ways. The width of the slide 214 being less than the width of the ways, the slide 214 may turn in a horizontal plane about the pivot formed by the pin 218 and may reciprocate in an axial direction for a distance equal to the length of the slot 217. The hose 24 is pivotally connected, as at 219, to the outer end of the slide 214 by the clamp 220. The switch actuating arm 204 is normally retained in depressed position, as shown in Figure 2, by the power storing means 208. In this position, the switches 200 are open and the slide 214 is at its extreme inward or left hand or retracted position, as shown in Figure 2, with the hose 24 hanging down beside the housing 20. In order to close the master switch 200 and thereby permit the pump motor circuit to be energized, the operator must pull on the hose to thereby rock the rock shaft 206 in a clockwise direction, as shown in Figure 3, to rock the bell crank 212, 204 in a clockwise direction and raise the operating rod 202 to close switch 200.

Thus although the removal of the nozzle from its support and the return of the dial to zero places the circuits in condition to actuate the flow establishing means, current cannot flow through the circuits to energize the motor 28 or motor means 149 until switch 200 is closed.

Switch 200 may be opened and closed at will without returning the nozzle to its support or the dial to zero and a transaction may be continued, as will now be described.

With the pull hose control as illustrated, it may be assumed, for example, that a customer has ordered five gallons of fuel. The attendant has removed the nozzle from its hook, the dials have returned to zero position, the attendant has pulled on the hose thereby closing switch 200 and delivered the five gallons into the fuel tank of a motor vehicle. The attendant has then released the hose so that the switch 200 has again been opened by the weight 208. This, of course, has deenergized solenoid 149 and resulted in the opening of switches 153 and 152. Suppose that the customer now decides to take two more gallons of fuel. A pull on the hose will close switch 240 and, of course, switch 124 is still closed. This, however, is not sufficient to effect the energization of the solenoid since the solenoid circuit is broken on the one hand by the dial switch 125, and on the other hand by the open contacts 153. The clutch has not been affected, however, so the dials remain in position and as the dials are off zero position the stud 166 has moved upwardly. In order to energize the solenoid, it is, therefore, necessary to close switch 125 and to this end what may be called a false dial stop 266 is provided which shall have the same effect as the pin 166 insofar as the temporary closing of the switch 125 is concerned, and which operates exactly as the pin 166 to that degree necessary for the purpose at hand. This false stop 266 is preferably carried on the same arm 204, rocked whenever the hose 24 is pulled and is adapted to contact with and to move an arm 267 fixed on the rock shaft 67 so that when, as viewed in Figure 13, the arm 204 is rocked upwardly by pulling on the hose 24, it strikes the arm 267 and rocks the rock shaft 67 in a clockwise direction, as viewed in Figure 13, through almost but not quite the same angle as that effected by the pin 166. This may be understood from an inspection of Figure 8 wherein, although the segment 148 has rotated to move the pin 166 away from initial position during the delivery of fuel, the arm 267 has been moved upwardly by the arm 204 so that the arm 174 and rock shaft 67 occupy almost the same position that they would asume had the pin 166 moved them downwardly. In this situation, however, the arm 267 is not rotated upwardly quite as far as it moves with the rotation of shaft 67 when the arm 174 is depressed by pin 166 but only through an angle sufficient to close contacts 125 (these contacts are very sensitive) and start the pump, but not enough for arm 170 to depress arm 138 and affect the clutch. In order to permit of an exact or close adjustment of the position of the arm 267 for this operation, a set screw 268 as an adjustable bearing member may be disposed in the end thereof. It is to be noticed that the contacts 124, 240 etc. (Figure 14) are on very long leaf spring supports so that while a slight movement of the actuating arms (say 239) may close them, farther movement of the actuating arms as from the dial pin 166, is possible.

Dial brake

While it is desirable that the indicating means return to initial position quickly, it is also essential that the return be effected without shock to the parts. A governor and brake is, therefore, provided which shall control the speed of return of the parts and prevent such speed from exceeding a predetermined maximum.

Referring to Figures 8, 11 and 12, the frame 61 carries upon opposite sides of the fraction gallon pointer shaft 54 a pair of brackets 250, 252. A brake member 254 is pivotally and adjustably mounted for movement in a vertical plane, as at 256, to the bracket 250 and is spring pressed toward the shaft. Its other end is pivotally mounted, as at 258, to the bracket 252 for movement in a horizontal plane. Centrally the brake beam 254 is bent upwardly on an arc, at 255, and carries a brake shoe 259.

The split gallon shaft 54 has fixed thereto at its inner end a boss 260 which extends to a point below the brake beam 254. This boss 260 is vertically slotted and pivoted in the slot, on opposite sides of the shaft, are levers 262 having weights 264 at their outer ends, which weights are normally drawn toward each other by a spring 265.

These weighted levers constitute a governor which normally retains a brake lining out of contact with the brake shoes in the following manner: Also mounted on the boss 260 is a disc 266 carrying an annular brake lining 267. The disc is resilient and normally holds the brake lining against the brake shoe. The arms 261 of levers 261, 262 are of such shape and length that when the weights are drawn together by the spring, the ends of the arms bear against the disc 266 and hold the brake lining away from the brake shoe. When, however, the shaft rotates, the movement of the weights 264 outwardly under centrifugal force moves the ends 261 toward the shaft 54 and at a predetermined maximum speed, the ends 261 assume the dotted line position shown in Figure 12, at which time and in which position the arms permit the inherent resiliency of the disc to move toward the brake beam and engage the braking surfaces to retard the speed of rotation of the shaft.

A modification of the circuit closing devices, whereby they may all be enclosed in one casing, is illustrated in Figures 14 through 16.

Referring to Figure 14, the rock shaft, which is turned when the hose 24 is pulled, has a downwardly depending arm 230 fixed thereto and an arm 232 also fixed thereto at an angle to arm 230. The power storing means 208 tends to draw arm 232 downwardly against a stop 234. The pull of the hose tends to rock the arm 230 in a counterclockwise direction, as viewed in Figure 14, as will be understood.

The arm 230 is connected to one end of a link 236 having a lost motion connection at its other end with a lever arm 238 fixed to turn a switch operating arm 239 of the control switch contacts, 240, Figure 16.

The lost motion connection comprises a stop collar 241 on the link 206 between which and the arm 238 is a coil spring 242 and a nut 243 limits the relative movement of the link with respect to the arm in one direction under the action of the spring.

The same reference characters are affixed to the parts of the circuits where possible in Figure 16.

Let it be assumed that the dial 46 has recorded the delivery of a predetermined number of gallons so that the gear segment 148 has moved to the position shown in Figure 14. This has permitted the arm 174 to rock upwardly as shown, and the dial switch 125 has been opened. The attendant has also released the pull on the hose 24, permitting the weight 208 to open the control switch 240. If the customer changes his mind and decides to take some more fuel, the attendant again pulls on the hose and rocks the parts to the position illustrated in Figure 15, thereby again closing switch 240 and, by means of the extension 241, also closing the dial switch 125. Contacts 124 are, of course, closed because the nozzle is off the support.

Current is then permitted to flow from main 145 through line 150, solenoid winding 149 and a lead 242, through contacts 240 and through contacts 125, bus bar 146, nozzle contacts 124, lead 147 to the main 151. Energization of the solenoid thus closes contacts 151 and 153 and the holding circuit is completed.

The operation of the registering device for liquid dispensing apparatus is apparent from the foregoing description. Briefly, the cycle of the operations for each transaction is as follows:—

It may be assumed that the indicating means, in the illustrated embodiment, the dial, occupies a position to which it has been moved from initial or zero position in a preceding transaction, so that a number representing the number of units of liquid delivered in the previous transaction is visible before the window. When the liquid delivery means, i. e., the nozzle and/or valve 22, is removed from its support 112 preparatory to delivering liquid in the subsequent transaction, the meter is disengaged from the indicating mechanism 46 so that the indicating mechanism may be automatically returned to zero. At the same time, a maintaining switch 124 in a holding circuit for the motor circuit is closed. The fluid elevating means 26 is not started, however, until the indicating means has returned to initial position. The clutch 90, 92 between the meter shaft 76 and the drive 74, 84, for the indicating mechanism 46 is, therefore, held released until the indicating means 46 reaches initial position, at which time the meter 32 is again automatically clutched to the indicating mechanism 46 and the holding circuit for the motor circuit is closed and thereby enabling the motor to operate to actuate the fluid elevating means.

The motor, however, cannot commence to operate until the master or control switch 200 or 240 is closed by the attendant pulling on the hose.

The delivery of liquid, of course, actuates the meter thereby causing the movement of the indicating means away from the initial position to indicate the number of units of liquid delivered.

Movement of the indicating means away from initial position opens the switch 125 but the operation of the motor is continued because the contacts 151 are kept closed due to the fact that the solenoid 149 remains energized since it is also included in the holding circuit which is completed so long as the switch 124 remains closed.

The operation of the flow establishing means continues until the fluid delivery means 22 is returned to its support 112 or the indicating means has moved to the limit of its capacity to indicate units of fluid delivered, when the motor circuit is broken by interrupting the holding circuit by opening contacts 124, the meter remaining clutched to the indicating means whereby the indication of the number of units of liquid delivered in that transaction remains visible. There is thus an elapse of time between the removal of the fluid delivery means from its support until the fluid elevating means commences to operate. The elapsed time mechanism is illustrated as the return rotation of the indicating means to initial position, but it will be obvious that, in some circumstances, any suitable elapsed time means may be availed of whereby the operation of the fluid elevating means is delayed for any purpose after a cycle of operations commences.

Should the operator release the hose but not return the nozzle to its support, the switch 200 or 240 is opened, thus breaking the holding circuit and deenergizing the electromagnet. The switches 151 in the motor circuit then open and the motor ceases to operate. If it is now desired to continue the delivery of fluid in this same transaction and have the indicating devices show the total of fluid delivered in that transaction, the attendant may again pull on the hose and effect the energization of the solenoid in the following manner: Upon pulling on the hose, the rock shaft 206 is again turned causing the rotation of the arm 204 in a clockwise direction, as viewed in Figure 3. The portion 266 of this arm strikes the adjusting screw 268 of the arm 267 and elevates that arm, thereby turning the rock shaft 66 in a counter-clockwise direction through the same angle as the shaft 67 would be turned were the arm 174 depressed by the lug 166. Rotation of the arm 67 in this manner moves the arm 171 in a counter-clockwise direction and effects the closing of the switch 125, thereby again energizing the electromagnet and closing the switch 151 in the motor circuit. Of course, the tension on the hose also closes the master switch 200 or 240, as the case may be.

It will thus be seen that a liquid dispensing apparatus has been provided which is suitable for dispensing gasoline and other motor fuels at roadside service stations. In the preferred embodiment, the return of the indicating means to initial position is entirely automatic and preferably the return of the indicating means to initial position and the starting of the pump are initiated by the removal of the nozzle from the support. At the same time, the indicating means is prevented from overrunning that point which represents its maximum indication of the fluid delivered and no more fluid can be delivered than the indicating means can indicate. The latter feature has the further material advantage of limiting the fire hazard since, should the hose break or otherwise become out of order, no more than a predetermined quantity of fluid can be spilled before the pump is automatically shut off. Moreover, as a further safety feature, whenever tension on the hose is relieved, the pump motor circuit is interrupted and the passage of liquid through the meter is immediately halted.

Various modifications will occur to those skilled in the art in the disposition and configuration of the component elements going to make up this invention as a whole as well as in the selection and/or combinations of certain of the features independently of others or the substitution therefor of other means accomplishing the same result, and no limitation is intended by the phraseology of the foregoing description or illustrations in the accompanying drawings, except as indicated in the appended claims.

What is claimed is:—

1. In liquid delivery apparatus having a delivery hose, in combination, a meter, an indicator movable away from zero position in proportion to the amount of fluid passed through the meter, mechanism for resetting the indicator to zero position, means for delivering liquid through the meter, actuating means for starting and stopping the delivery means, means interconnecting the resetting mechanism and the actuating means to insure the indicator being at zero position when the delivery means is started and means connected with the hose and preventing the starting of the delivery means except when the means connected with the hose is under tension.

2. In liquid delivery apparatus, in combination of a meter, an indicator movable away from zero position in proportion to the amount of fluid passed through the meter, mechanism for resetting the indicator to zero position, means for effecting liquid flow through the meter, electric switch means controlling operation of said liquid flow effecting means, interconnecting means between said switch means and indicator resetting mechanism for insuring return of the indicator to zero position before operation of the switch means effecting operation of said liquid flow effecting means and means operable only upon the application of tension thereto controlling the operation of said switch means.

3. In liquid dispensing apparatus, in combination, a pump, an electrical motor driving the pump, an electrical circuit comprising the motor and a switch, liquid metering means, a rotatable member whereof the movement away from initial position is proportional to the amount of liquid passed through the metering means, a pin carried by the rotatable member and movable therewith, a lever actuated by said pin when the rotating member is at initial position, means to close the switch, controlling connections between said lever and said switch closing means to actuate said switch upon movement of said lever and means operable upon the application of tension thereto to close the switch.

4. In liquid dispensing apparatus, in combination, a pump, an electrical motor driving the pump, an electrical circuit comprising the motor and a switch, liquid metering means, a rotatable member whereof the movement away from initial position is proportional to the amount of liquid passed through the metering means, a pin carried by the rotatable member and movable therewith, a lever actuated by said pin when the rotatable member is at initial position, means to actuate the switch, controlling connections between said lever and said switch actuating means to actuate said switch upon movement of said lever comprising power storing means and operable only upon the application of tension thereto to close the switch.

5. In liquid dispensing apparatus having a delivery hose, in combination, liquid flow establishing means, electrical motor means actuating said flow establishing means, an electrical circuit comprising the motor means and a first switch and a second switch, liquid metering means having a shaft the movement of which is proportional to the amount of liquid passed through the metering means, a rotatable member whereof the movement away from an initial position is proportional to the amount of liquid passing through the metering means, clutch means between the shaft and the rotatable member permitting said member to be returned to initial position, a pin carried by said rotatable member, a lever actuated by said pin when the rotating member is at initial position, means to actuate said first switch, controlling connections between said lever and said switch actuating means to actuate said switch upon movement of said lever and operative connections between the hose and the second switch to close the same when tension is applied to the hose.

6. In liquid dispensing apparatus having a delivery hose, in combination, liquid flow establishing means, electrical motor means actuating said flow establishing means, an electrical circuit comprising the motor means and a first switch and a second switch, liquid metering means having a shaft the movement of which is proportional to the amount of liquid passed through the metering means, cam means whereof the movement away from an initial position is proportional to the amount of liquid passing through the metering means, clutch means between the shaft and the cam means permitting said cam means to be returned to initial position, means to return said cam means to initial position, a lever actuated by said cam means when said cam means is at initial position, means to actuate said first switch, controlling connections between said lever and said switch actuating means and operative connections between the hose and the second switch to close the same when tension is applied to the hose.

7. In liquid dispensing apparatus having a delivery hose, in combination, liquid flow establishing means, electrical motor means actuating said flow establishing means, an electrical circuit comprising the motor means and a first switch and a second switch, liquid metering means having a shaft the movement of which is proportional to the amount of liquid passed through the metering means, a rotatable member driven from the shaft and whereof the movement away from an initial position is proportional to the amount of liquid passing through the metering means, clutch means between the shaft and the rotatable member permitting said member to be returned to initial position, manually controlled means to return said rotating member to initial position, a pin carried by said rotatable member, a lever actuated by said pin when the rotating member completes its return movement to initial position, means to actuate said first switch, controlling connections between said lever and said switch actuating means and operative connections between the hose and the second switch to close the same when tension is applied thereto.

8. In liquid dispensing apparatus having flow establishing means, an electric circuit comprising a motor operating said flow establishing means and a first switch and liquid metering means through which the liquid flows, in combination, a member rotatable away from an initial position the movement of which is proportional to the quantity of liquid metered, operative connections between the metering means and the rotatable member, clutch means whereby said rotatable member is freed from the metering means for return to initial position, a pin carried by the rotatable member, means actuated by the pin when at initial position of the rotatable member to initiate the closing of the switch, a second switch in said circuit, a member to which tension may be manually applied, independent means to close said switches and operative connections between the tension member and one of said independent switch closing means whereby said switch may be controlled by manual application of tension.

9. In liquid dispensing apparatus comprising motor means, an electrical circuit therefor having a switch, a hose, a delivery nozzle thereon, a support therefor, a rock shaft, means engageable with the support and rock shaft to turn the rock shaft in one direction when the nozzle is on the support, a switch closing lever, a first arm loosely mounted on the rock shaft and operatively connected to the lever, power storing means tending to move the arm to open switch position, a second arm fixed on the shaft and adapted to move the first arm to switch closing position when the nozzle is removed from its support.

10. In liquid dispensing apparatus comprising a hose, a delivery nozzle thereon, a meter, liquid flow establishing means by which liquid is caused to flow through the meter, a motor actuating said means, an electrical circuit for the motor having a switch, a member movable from initial position in proportion to the amount of liquid passed through the meter, a support for the nozzle, a rock shaft, means engageable by the support to turn the rock shaft in one direction when the nozzle is on the support, a switch closing lever, a first arm loosely mounted on the shaft operatively connected to the lever, power storing means tending to move the first arm to open switch position, a second arm fixed on the shaft and adapted to move the first arm to switch closing position when the nozzle is removed from its support and means carried by the movable member adapted, at the extreme position thereof away from initial position, to actuate the switch closing lever.

11. In liquid dispensing apparatus comprising a meter, means to establish liquid flow through the meter, an indicator driven from the meter and movable from initial position in proportion to the amount of liquid passed through the meter, means to return said indicator to initial position, a rock shaft, a first arm carried thereby, means movable synchronously with the indicator to engage and move the arm at initial position of the indicator and turn the shaft through a predetermined angle, a second means movable synchronously with the indicator and a second arm carried by the shaft and movable when the first arm is moved to intercept the second movable means and halt its movement at initial position.

12. In liquid dispensing apparatus comprising a meter, means to establish liquid flow through the meter, an indicator driven from the meter and movable from initial position in proportion to the amount of liquid passed through the meter, a first means movable synchronously with the indicator, means to return said indicator to initial position, a second means movable with the first means, a rock shaft, a first arm carried thereby, means carried with the first means to engage and move the arm at initial position and turn the shaft through a predetermined angle, a second arm carried by the shaft and movable when the first arm is moved to intercept the second means and halt its movement when the indicator member is at initial position and yielding means carried with the second arm adapted to yield if said movable means engages the second arm except at its end.

13. In liquid dispensing apparatus comprising a delivery hose, a meter, means to establish liquid flow through the meter to the hose, a first means movable from initial position in proportion to the amount of liquid passed through the meter, a second means movable synchronously therewith, means to return said first means to initial position, a rock shaft, a first arm carried thereby, means carried with the first means to engage and move the arm when the first means reaches initial position and turn the shaft through a predetermined angle, a second arm carried by the rock shaft to intercept the second means when the first means is at initial position, means to move the second arm independently of the first means to intercept the second means and operable connections between the delivery hose and the movable means for the second arm to actuate the independently movable means.

14. In liquid dispensing apparatus comprising a meter through which the liquid passes, indicating means the movement of which is proportional to the amount of liquid passed through the meter, operative connections between the indicating means and the meter adapted to be rendered inoperative to permit the return of the indicating means to zero position, means to return the indicating means to zero position, a delivery nozzle and a support therefor, flow establishing means, electrical motor means, an electrical circuit therefor comprising, the combination of a first switch, means to close the first switch when the nozzle is removed from its support, a second switch controlling the circuit, means to close the second switch when the indicating means is at zero position, an electrical motor means circuit comprising a third switch, a holding circuit comprising the second switch and a fourth switch, a second motor means to close the third and fourth switches and a circuit comprising the first and second switches and the second motor means.

15. In liquid dispensing apparatus comprising a meter through which the liquid passes, indicating means the movement of which is proportional to the amount of liquid passed through the meter, operative connections between the indicating means and the meter adapted to be rendered inoperative to permit the return of the indicating means to zero position, means to return the indicating means to zero position, a delivery nozzle and a support therefor, flow establishing means, electrical motor means therefor comprising an electrical circuit comprising a first switch, means to close the first switch when the nozzle is removed from its support, a second switch, means to close the second switch when the indicating means is at zero position, an electrical motor means circuit comprising a third switch, a holding circuit for the first circuit comprising the second switch and a fourth switch, a second motor means to close the third and fourth switches, a circuit comprising the first and second switches and the second motor means, conducting means to supply electrical energy to said circuits, means normally interrupting said conducting means and operative connections between the nozzle and said interrupting means whereby displacement of the nozzle will render said interrupting means ineffective to interrupt the conducting means.

16. In liquid dispensing apparatus comprising a meter through which the liquid pases, indicating means the movement of which is proportional to the amount of liquid passed through the meter, operative connections between the indicating means and the meter adapted to be rendered inoperative to permit return of the indicating means to zero position, means to return the indicating means to zero position, a delivery nozzle and a support therefor, flow establishing means, electrical motor means therefor comprising an electrical circuit comprising a first switch, means to close the first switch when the nozzle is removed from its support, a second switch, means to close the second switch when the indicating means is at zero position, an electrical motor means circuit comprising a third switch, a holding circuit for the first circuit comprising the second switch and a fourth switch, a second motor means to close the third and fourth switches, a circuit comprising the first and second switches and the second motor means, a fifth normally open switch in series with the second switch, means to close the second switch whenever the fifth switch is closed, means to close the fifth switch and operative connections between the nozzle and the last named means whereby displacement of the nozzle will close the fifth switch.

17. In liquid dispensing device, comprising a meter through which the liquid passes, indicating means the movement of which is proportional to the amount of liquid passed through the meter, operative connections between the indicating means and the meter, means to render said connections inoperative, means tending to return the indicating means to zero position and means to govern the speed of return of the indicating means.

18. In liquid dispensing device, comprising a meter through which the liquid passes, indicating means the movement of which is proportional to the amount of liquid passed through the meter, operative connections between the indicating means and the meter, means to render said connections inoperative, means tending to return the indicating means to zero position and frictional means to govern the speed of return of the indicating means.

19. In liquid dispensing device, comprising a meter through which the liquid passes, indicating means the movement of which is proportional to the amount of liquid passed through the meter, operative connections between the indicating means and the meter, means to render said connections inoperative, means tending to return the indicating means to zero position, frictional means to retard the speed of return of the indicating means and means dependent upon the speed of movement of the indicating means to cause the application of the frictional means.

20. In liquid dispensing device, comprising a meter through which the liquid passes, indicating means comprising a shaft the movement of which is proportional to the amount of liquid passed through the meter, operative connections between the indicating means and the meter, means to render said connections inoperative, means tending to return the indicating means to zero position, a brake member carried with the liquid dispensing device, a cooperating brake member rotating with the shaft, means normally urging said break members into engagement and means to render said last named means inoperative when the speed of movement of the cooperating brake members is below a predetermined minimum.

21. In liquid dispensing device, comprising a meter through which the liquid passes, indicating means comprising a shaft the movement of which is proportional to the amount of liquid passed through the meter, operative connections between the indicating means and the meter, means to render said connections inoperative, means tending to return the indicating means to zero position, a brake member adjustably carried with the liquid dispensing device, a resilient member carried with the shaft, a cooperating brake member carried thereby and normally maintained in engagement with the first named brake member, at least one lever pivotally carried with the shaft one end of which is adapted, in one position, to engage and deflect the resilient member, a weight carried by the other end of the lever and a spring to move the lever to the deflecting position.

22. A liquid dispensing system including a delivery hose, a pump and driving means therefor, a liquid meter for measuring the dispensed liquid, an indicator driven by the meter, means for preventing the resetting of the indicator while the driving means is driving the pump and means connected with the hose and preventing the starting of the driving means except when the means connected with the hose is under tension.

23. A liquid dispensing system including a delivery hose, a pump and driving means therefor, a liquid meter for measuring the dispensed liquid, an indicator driven by the meter, means for preventing the resetting of the indicator while the driving means is driving the pump and means connected with the hose and comprising power storing means normally rendering the driving means inoperative and rendered inoperative when the means connected with the hose is under tension.

24. A liquid dispensing system including a delivery hose, a pump and driving means therefor, a liquid meter for measuring the dispensed liquid, an indicator driven by the meter, means for preventing the resetting of the indicator while the driving means is driving the pump and means connected with the hose and comprising a weight operatively connected with the driving means and tending to render the same inoperative but rendered inoperative to permit the starting of the driving means when the means connected with the hose is under tension.

25. In liquid dispensing apparatus, in combination, a delivery hose, liquid flow establishing means comprising a first control means and a second control means, indicating means movable away from zero position in proportion to the quantity of liquid flowing through the apparatus, cyclically operating zeroizing means which at the end of its operation has restored the indicating means to zero position and which, during one portion of its movement, moves to operative position the first control means, movable means to render the second control means operative, said movable means being actuated by the indicating means in its movement to zero position, said movable means being inoperative to control the flow establishing means when the indicating means is moving away from zero position in recording the flow of liquid through the apparatus, and means connected with the hose and preventing the starting of the flow establishing means except when the means connected with the hose is under tension.

26. In liquid dispensing apparatus, in combination, a delivery hose, liquid flow establishing means comprising a first control means and a second control means, indicating means movable away from zero position in proportion to the quantity of liquid flowing through the apparatus, cyclically operating zeroizing means which at the end of its operation has restored the indicating means to zero position and which during one portion of its movement moves to operative position the first control means, movable means to render the second control means operative, said movable means being actuated by the indicating means in its movement to zero position, said second means being inoperative to effect control of the flow establishing means when the indicating means is moving away from zero position and means connected with the hose and comprising power storing means normally rendering the flow establishing means inoperative and rendered inoperative when the means connected with the hose is under tension.

27. In liquid dispensing apparatus, in combination, a delivery hose, liquid flow establishing means comprising a first control means and a second control means, indicating means movable away from zero position in proportion to the quantity of liquid flowing through the apparatus, cyclically operating zeroizing means which at the end of its operation has restored the indicating means to zero position and which during one portion of its movement moves to operative position the first control means, movable means to render the second control means operative, said movable means being actuated by the indicating means in its movement to zero position, said second control means being inoperative when the indicating means is moving away from zero position and means connected with the hose and comprising power storing means and operatively connected with the flow establishing means and rendering the same inoperative but rendered inoperative to permit the starting of the flow establishing means when the means connected with the hose is under tension.

28. In a liquid dispensing system, in combinations, a delivery hose having a nozzle, flow establishing means comprising a first control means and a second control means, indicating means movable away from zero position in proportion to the flow of liquid established by the flow establishing means, cyclically operating zeroizing means to restore the indicating means to zero position, said zeroizing means in one phase of the cycle rendering operative the first control means, a nozzle support comprising a movable member, said movable member actuating the second control means and means connected with the hose and preventing the actuation of the flow establishing means except when the means connected with the hose is placed under tension.

29. In a liquid dispensing system, in combination, a delivery hose having a nozzle, flow establishing means comprising a first control means and a second control means, indicating means movable away from zero position in proportion to the flow of liquid established by the flow establishing means, cyclically operating zeroizing means to restore the indicating means to zero position, said cyclic movement being completed and said restoration to zero being completed substantially simultaneously, said zeroizing means in one phase of the cycle rendering operative the first control means, a nozzle support comprising a movable member, said movable member actuating the second control means and means connected with the hose and preventing the actuation of the flow establishing means except when the means connected with the hose is placed under tension.

30. In a liquid dispensing system, in combination, a delivery hose, a pump, an electric motor for driving the pump, a switch through which the motor may be energized, a liquid meter for measuring the liquid dispensed, a resettable indicator driven by said meter having a predetermined initial position, means for preventing the resetting of the indicator when the switch is closed, a device moved with said indicator to control said preventing means, means for opposing closing of said switch and means interconnecting said means and the hose and rendering said opposing means inoperative when the interconnecting means is placed under tension.

31. In a liquid dispensing system, in combination, a delivery hose having a nozzle, flow establishing means comprising control means and a control switch, indicating means movable away from zero position in proportion to the flow of liquid established by the flow establishing means, cyclically operating zeroizing means to restore the indicating means to zero position, said zeroizing means during one portion of its movement in the cycle rendering operative the control means, a nozzle support comprising a movable member, a rockable member having an arm, and means interconnecting the movable member and the rockable member, the arm of said rockable member when the nozzle is placed on the support rendering said control means inoperative and means connected with the hose and preventing the closing of the switch except when the means connected with the hose is placed under tension.

32. In liquid dispensing apparatus, in combination, a delivery hose having a nozzle, a member movable between two positions, in one of which positions said member is controlled by the nozzle in supported relation, a meter, a resettable indicator to indicate the quantity of liquid flowing through the meter, operative connections between the meter and the indicator, fluid flow establishing means comprising a switch closed by the movable member when the nozzle is removed from supported relation, cyclically operating zeroizing means to reset the indicator, means to render said operative connections inoperative when the zeroizing means is resetting the indicator and means connecting with the hose and preventing the establishment of fluid flow except when the means connected with the hose is under tension.

33. A liquid dispensing system including a delivery hose, a pump and an electric motor for driving the same, a switch through which the motor may be energized, a liquid meter for measuring the liquid dispensed, a resettable indicator driven by said meter having a predetermined initial position, means operated with said switch for preventing the resetting of said indicator while said switch is closed and means connected with the hose and controlling the delivery of liquid except when said means is under tension.

34. A liquid dispensing system including a delivery hose, a pump and driving means therefor including a control element, a dispensing conduit for receiving liquid from said pump, a liquid meter connected to said conduit for measuring the dispensed liquid, an indicator driven by the meter, means for resetting said indicator, a device for preventing resetting movement of said resetting means and actuated with said driving means so that resetting cannot occur when said element is in position for the operation of said pump and means connected with the hose and controlling the delivery of liquid except when said means is under tension.

35. A liquid dispensing system including a dispensing conduit, means for producing a flow of liquid into said conduit and including an element for controlling said means, a liquid meter connected to said conduit for measuring the dispensed liquid, an indicator driven by the meter, means for resetting said indicator, a device for preventing resetting movement of said resetting means and connected for operation with said control element so that resetting cannot occur while the said element is in position for effecting a flow of liquid into said conduit and means connected with the conduit and controlling the delivery of liquid except when said means is under tension.

36. A liquid dispensing system including a delivery hose, a pump and driving means therefor, a liquid meter for measuring the dispensed liquid, an indicator driven by said meter and having a predetermined initial position, means for preventing the energization of the driving means when the indicator is in other than initial position, and means connected with the hose and preventing the energization of the driving means except when said means connected with the hose is under tension.

HARRY T. GOSS.
BJORNULF JOHNSEN.